US008661355B1

(12) United States Patent
Liu et al.

(10) Patent No.: US 8,661,355 B1
(45) Date of Patent: Feb. 25, 2014

(54) DISTINGUISHING SHARED AND NON-SHARED APPLICATIONS DURING COLLABORATIVE COMPUTING SESSIONS

(75) Inventors: Guangbing Liu, Sunnyvale, CA (US); Jiannong Gu, Sunnyvale, CA (US); Hailei Sheng, Fremont, CA (US); Haitao Xin, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 831 days.

(21) Appl. No.: 12/248,944

(22) Filed: Oct. 10, 2008

(51) Int. Cl.
    *G06F 3/048* (2013.01)
(52) U.S. Cl.
    USPC ............................. 715/759; 715/760; 715/768
(58) Field of Classification Search
    USPC .......................... 715/759, 760, 768
    See application file for complete search history.

(56) References Cited

U.S. PATENT DOCUMENTS

| 5,758,110 | A  | * | 5/1998  | Boss et al. ................. 715/751 |
| 5,760,769 | A  | * | 6/1998  | Petrie ............................. 715/759 |
| 6,002,397 | A  |   | 12/1999 | Jaaskelainen, Jr. |
| 6,308,199 | B1 | * | 10/2001 | Katsurabayashi ........... 709/204 |
| 6,329,984 | B1 | * | 12/2001 | Boss et al. ................. 715/723 |
| 6,601,087 | B1 |   | 7/2003  | Zhu et al. |
| 6,629,129 | B1 | * | 9/2003  | Bookspan et al. ........... 709/204 |
| 6,691,154 | B1 |   | 2/2004  | Zhu et al. |
| 7,028,266 | B2 | * | 4/2006  | Ben-Shachar et al. ........ 715/790 |
| 7,203,755 | B2 |   | 4/2007  | Zhu et al. |
| 7,222,305 | B2 |   | 5/2007  | Teplov et al. |
| 7,284,203 | B1 |   | 10/2007 | Meeks et al. |
| 7,518,664 | B2 |   | 4/2009  | Mather et al. |
| 7,734,690 | B2 | * | 6/2010  | Moromisato et al. ......... 709/204 |
| 2003/0167301 | A1 |   | 9/2003  | Zhu et al. |
| 2003/0182375 | A1 |   | 9/2003  | Zhu et al. |
| 2003/0189601 | A1 |   | 10/2003 | Ben-Shachar et al. |
| 2004/0024819 | A1 | * | 2/2004  | Sasaki et al. .................. 709/205 |
| 2006/0161622 | A1 | * | 7/2006  | Montgomery et al. ....... 709/204 |
| 2006/0161623 | A1 |   | 7/2006  | Montgomery et al. |
| 2006/0161624 | A1 |   | 7/2006  | Montgomery et al. |
| 2006/0168533 | A1 | * | 7/2006  | Yip et al. ...................... 715/753 |
| 2006/0190826 | A1 |   | 8/2006  | Montgomery et al. |
| 2006/0248144 | A1 |   | 11/2006 | Zhu et al. |
| 2007/0143103 | A1 |   | 6/2007  | Asthana et al. |
| 2007/0156810 | A1 |   | 7/2007  | Kumar |
| 2007/0255788 | A1 | * | 11/2007 | Troung ......................... 709/205 |
| 2008/0005233 | A1 | * | 1/2008  | Cai et al. ....................... 709/204 |

OTHER PUBLICATIONS

Xia et al.; An Integrated Session and Repository Management Approach for Real-Time Collaborative Editing Systems; © 2006; IEEE; 8 pages.*
Lee et al.; Experiences with Collaborative Applications that Support Distributed Modeling; © 2001; IEEE; 10 pages.*

* cited by examiner

*Primary Examiner* — Linh K Pham

(57) ABSTRACT

In one embodiment, a presenter device participates in an online collaborative computing session, and a determination is made to whether application windows on the presenter device are shared or non-shared, where shared application windows have a viewable portion on a display of the presenter device that may be transmitted to one or more attendee devices of the online collaborative computing session. Each of the one or more non-shared application windows on the display of the presenter device may be grayed out, such as by covering the non-shared application windows with a semi-transparent window.

20 Claims, 10 Drawing Sheets

DISTINGUISHING SHARED AND NON-SHARED APPLICATIONS DURING COLLABORATIVE COMPUTING SESSIONS

TECHNICAL FIELD

The present disclosure relates generally to computer networks, and, more particularly, to collaborative computing sessions.

BACKGROUND

Collaborative computing sessions, such as interactive conferences (e.g., "web" or "online" conferences/meetings), may be supported by a network of servers and client computers. In particular, one feature available to online meetings or data conferencing systems is to allow computer users at different locations to communicate via a computer network and share applications stored and/or executed on one of the users computers, such as through a software program that enables the users to share applications (e.g., sharing a presenter's application with one or more attendees/viewers).

A conventional technique for sharing applications during a data conference is to is share a predefined area of the presenter's computer screen with an attendee (e.g., "desktop sharing"). Using this technique, the presenter's computer captures an image within a predefined portion of the presenter's computer screen/display (e.g., the entire screen or a portion of the screen). The captured image within the predefined portion of the presenter's computer screen is then transmitted to the attendee's computer for viewing. Thus, replicas of any windows that are displayed within the predefined portion of the presenter's computer screen are displayed on the attendee's computer screen.

A refinement to this conventional technique allows the presenter to selectively share application windows with the attendee (e.g., "application sharing"). Thus, non-shared application windows placed within the predefined portion of the presenter's computer screen may be blocked from the attendees. When selectively sharing applications, however, it may be difficult for the presenter to know which application windows have been shared or not, thus which application windows are being viewed by each of the attendees. Not only may this cause cumbersome meeting activity and presenter (and attendee) frustrations, but it may also present security problems when accidentally (and unknowingly) sharing applications with secure/private information contained therein.

BRIEF DESCRIPTION OF THE DRAWINGS

The embodiments described herein may be better understood by referring to the following description in conjunction with the accompanying drawings in which like reference numerals indicate identically or functionally similar elements, of which.

DESCRIPTION OF EXAMPLE EMBODIMENTS

Overview

According to embodiments of the disclosure, a presenter device participates in an online collaborative computing session, and a determination is made to whether application windows on the presenter device are shared or non-shared, where shared application windows have a viewable portion on a display of the presenter device that may be transmitted to one or more attendee devices of the online collaborative computing session. Each of the one or more non-shared application windows on the display of the presenter device may be grayed out, such as by covering the non-shared application windows with a semi-transparent window (e.g., sized and positioned to a total area of the display of the presenter device subtracted by an area having the viewable shared application windows).

DESCRIPTION

Architecture for Collaborative Computing Sessions

Figure 1:
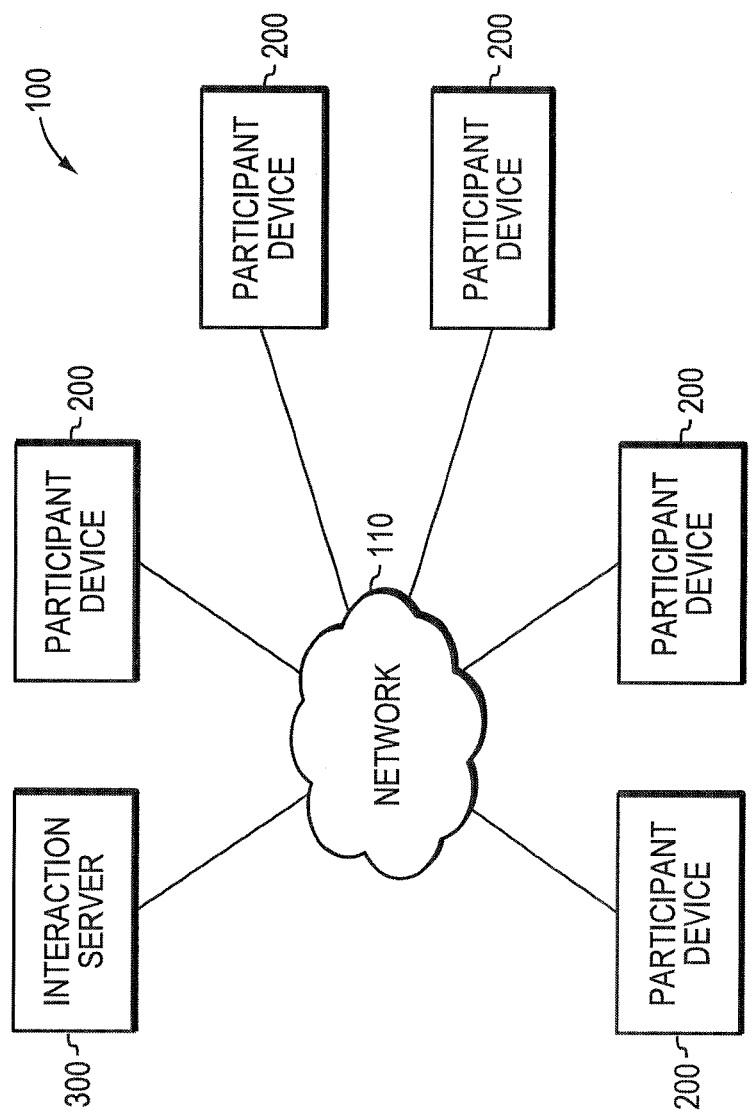
FIG. 1 illustrates an example computer network.

FIG. 1 is a schematic block diagram of an example computer network 100 illustratively comprising nodes/devices, such as one or more participant devices 200 and one or more interaction servers 300 interconnected by links/network 110 as shown and as described further herein. For instance, participant devices, as described below, may be a personal computer (PC) or one or more peripheral devices, such as phones, pagers, etc. Those skilled in the art will understand that any number of nodes, devices, links, etc. may be used in the computer network, and that the view shown herein is for simplicity.

In this environment, a number of participants may interact in an on-line, interactive, or collaborative setting. Such a setting can be for a meeting, training or education, support, or any other event that may require a number of participants to work together, interact, collaborate, or otherwise participate, such as web conferences, on-line meetings, etc. As used herein, the phrase "collaborative computing session" may be used to describe these settings/events, particularly where a number of participant computers/devices collaborate in an established session, as may be appreciated by those skilled in the art. Also, as used herein, a "session" describes a generally lasting communication between one or more participant devices 200 through the interaction server 300. Those skilled in the art will understand that the session may be implemented/established using protocols and services provided by various layers (e.g., application, session, and/or transport layers) of a network protocol stack according to the well-known OSI model. Conversely, a "meeting" describes a personal layer of communication overlaid upon the session where participants/users communicate with each other. Moreover, while the terms "session" and "meeting" may generally be used interchangeably herein to denote a collaboration of people or devices, particular instances of their use may denote a particular distinction (e.g., a session may start with attendees joining/connecting to the servers, while a meeting may not start until a host/presenter joins the session), as may be understood by those skilled in the art.

In other words, a collaboration session comprises a plurality of devices or "participant devices," of which "attendee devices" are configured to view/receive content submitted or "shared" by "presenter devices." In some instances, the attendee devices are capable of modifying the content shared by the presenter device.

Notably, a collaborative computing session as used herein is distinguished from groups of computers "collaborating" for computational (e.g., processing or memory) or computerized measuring and/or monitoring purposes, such as those for use with tracking stock markets, measuring parameters (e.g., field instruments), network devices (e.g., routers, switches, storage devices, etc.), or other types of devices and associated "sessions." That is, a collaborative computing session as used herein defines a session among participant devices 200 and an interaction server 300 for use with sharing/distributing video and/or audio for presentations, meetings, or other personally collaborative events.

In particular, each participant (e.g., hosts/presenters and/or attendees) may operate a participant device 200. Each participant device 200 may comprise an electronic device with capability for visual and/or auditory presentation. Thus, a participant device 200 can be, for example, a desktop personal computer (PC), a laptop computer, a workstation, a personal digital assistant (PDA), a wireless telephone, a smart phone, an Internet television, and the like. Each participant device 200 supports communication by a respective participant, in the form of suitable input device (e.g., keyboard, mouse, stylus, keypad, etc.) and output device (e.g., monitor, display, speech, voice, or other device supporting the presentation of audible/visual information). Each participant device may be interconnected with a suitable communications network 110 such as, for example, the Internet, and may appear as a client computer thereon.

In one embodiment, each participant device 200 may operate under the control of a suitable operating system (OS) (e.g., WINDOWS, UNIX, etc.) to run software applications (e.g., in the form of code modules) which may be installed, received, or downloaded. At least some of these software applications may support specific functions, such as, for example, functions related to the on-line, interactive meeting (a collaborative computing session), such as conventional web browser programs that allow convenient access and navigation of the Internet (e.g., the World Wide Web).

The on-line meeting (collaborative computing session) of the various participants may be supported by an interaction server 300 which may be maintained or operated by one or more of the participants and/or a third-party service provider. The interaction server 300 may be a computer system that is connected to network 110, and which may comprise and appear as one or more server computers thereon. Interaction server 300 may store information (e.g., content) and application modules which can be provided to the participant devices 200. In some embodiments, these application modules are downloadable to the participant devices 200 and may support various functions that may be required for an interactive meeting or collaborative effort among the participants. The participant devices 200 and the interaction server 300 may interact in a client/server architecture, which may provide high performance and security for a multi-participant collaborative environment.

Network 110 may comprise or be supported by one or more suitable communication networks, such as, for example, a telecommunications network that allows communication via one or more telecommunications lines/channels. In particular, the communication or data networks, such as the Internet, may be used to deliver content, such as for the collaborative computing sessions herein. The Internet is an interconnection of computer clients and servers located throughout the world and exchanging information according to Transmission Control Protocol/Internet Protocol (TCP/IP), Internetwork Packet eXchange/Sequence Packet eXchange (IPX/SPX), AppleTalk, or other suitable protocol. The Internet supports the distributed application known as the "World Wide Web." Web servers maintain websites, each comprising one or more web pages at which information is made available for viewing and audio/hearing. Each website or web page may be supported by documents formatted in any suitable conventional markup language (e.g., HTML or XML). Information may be communicated from a web server to a client using a suitable protocol, such as, for example, Hypertext Transfer Protocol (HTTP) or File Transfer Protocol (FTP).

Figure 2:
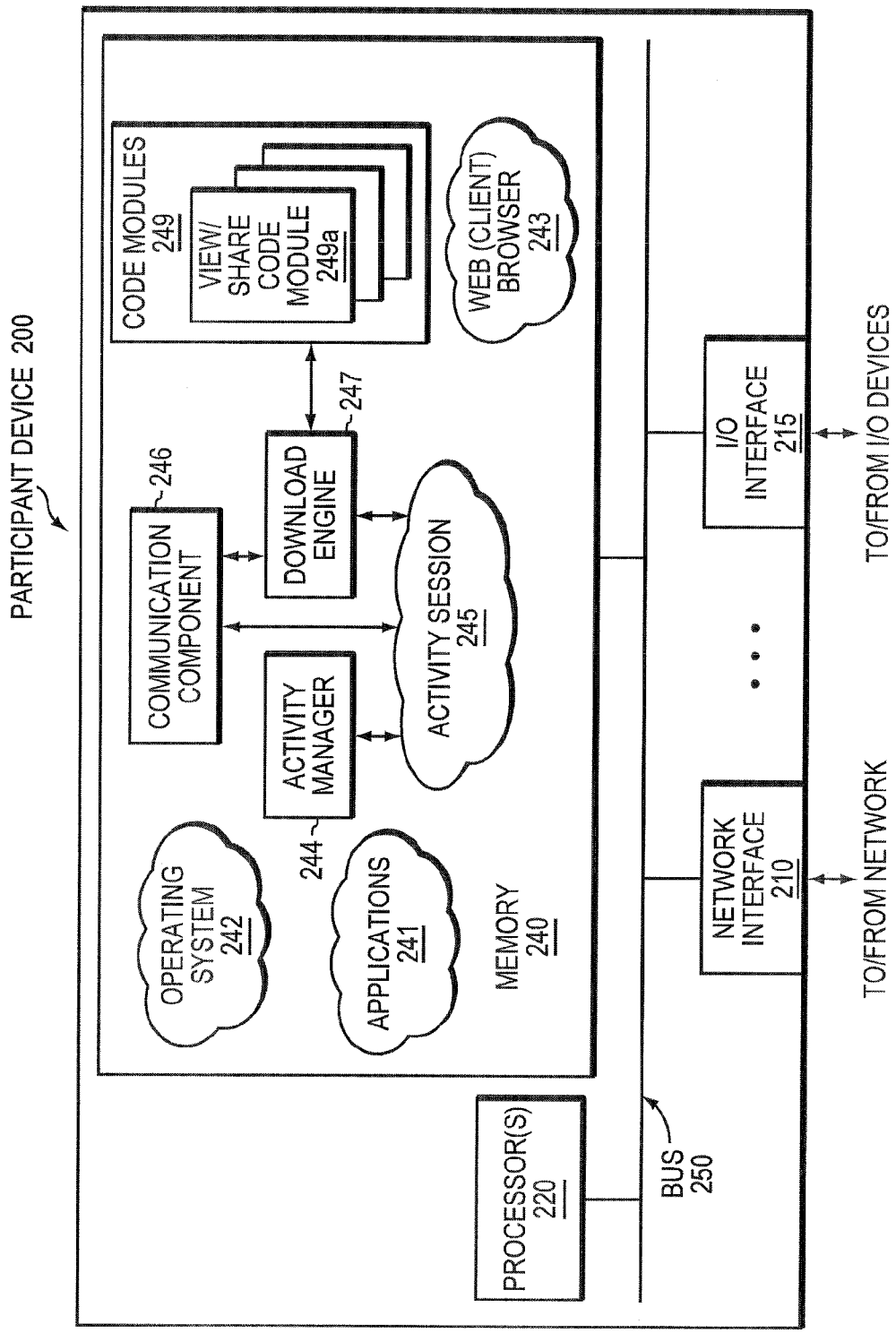
FIG. 2 illustrates an example participant device.

FIG. 2 illustrates a schematic block diagram of an example participant device 200 that may be advantageously used with one or more embodiments described herein, e.g., for collaborative computing. Illustratively, device 200 may be implemented or incorporated in any suitable computer such as, for example, a personal computer (PC), laptop, workstation, personal digital assistant (PDA), smart phone, mainframe, file server, workstation, or other suitable data processing facility supported by storage (either internal, e.g., electronic memory, or external, e.g., magnetic/optical disk), and operating under the control of any suitable OS.

In particular, the device 200 comprises one or more network interfaces 210, one or more input/output (I/O) interfaces 215, one or more processors 220, and a memory 240 interconnected by a system bus 250. The network interfaces 210 contain the mechanical, electrical, and signaling circuitry for communicating data over physical/wireless links coupled to the network 110. The network interface(s) may be configured to transmit and/or receive data using a variety of different communication protocols suitable for the network. Also, I/O interfaces 215 contain the mechanical, electrical, and signaling circuitry for communicating with one or more user interface devices, such as a mouse, keyboard, monitor/screen, etc. (not explicitly shown).

The memory 240 comprises a plurality of storage locations that are addressable by the processor(s) 220 and the network interfaces 210 for storing software programs associated with the embodiments described herein. A portion of the memory may (though need not) be arranged as a cache (not shown) configured to store one or more data structures and/or code modules 249 associated with the embodiments described herein. The processor(s) 220 may comprise necessary elements or logic adapted to execute the software programs and manipulate the data structures. An operating system 242, portions of which are typically resident in memory 240 and executed by the processor(s), functionally organizes the device by, inter alia, invoking operations in support of software processes and/or services executing on the device (e.g., for collaborative computing sessions as used herein). In particular, these software processes and/or services may comprise one or more applications 241, and, in particular, an activity manager 244, a communications component 246, a download engine 247, and an activity session 245. It will be apparent to those skilled in the art that other types of processors and memory, including various computer-readable media, may be used to store and execute program instructions pertaining to the inventive technique described herein, such as a web browser 243, known in the art. Also, activity manager 244, communications component 246, code modules 249, download engine 247, and/or activity session 245 may be operated as instances of suitable programs running on the hardware of a participant device 200, as will be further appreciated by those skilled in the art.

Activity manager 244 may contain computer executable instructions executed by each processor 220 to generally perform functions to manage or control various processes or aspects during the course of an activity (e.g., on-line meeting or collaborative computing session) in which the participant (user) may interact with other users. As shown in FIG. 2, this activity may be run in activity session 245. In the context of on-line meetings, for example, the activity manager 244 may manage meeting-related actions (e.g., starting a session, ending a session, locking a session, etc.), manage participant-related actions (e.g., designating a participant as a session host, assigning a participant the presenter privileges, expelling a participant, establishing participant privileges, etc.), manage session-related actions (e.g., starting a sharing session, closing a sharing session, setting privileges within that sharing session, etc.), and support an interface with the user or participant, and provide a container for embedding one or more application code modules.

A communications component 246 supports communication between system 200 and an outside network 110 (e.g., the Internet), such as through network interfaces 210. Communications component 246 thus allows data and information to be exchanged with or retrieved from other systems or facilities (e.g., participant devices 200 or interaction server 300), for example, during an online meeting or other collaborative computing session. In particular, the communications component 246 may provide a communication platform for any one or more of the activity manager 244, the activity session 245, the download engine 247, and the application code modules 249. The activity manager 244 may rely on the communications component 246 to establish and maintain the client connection to the interaction server 300 on which the activity session is hosted. Each application code module 249 may also use the established client connection to provide real-time data that is sent and received by each participant.

Various functionality for supporting a collaborative computing session, such as an on-line meeting, may be provided by the one or more application code modules 249. These application code modules 249 may be stored/maintained (e.g., by a cache), and may support, for example, basic communication framework, file sharing (e.g., for text, images, video, audio), user authentication, meeting scheduling, address book, files and folders, invoices, billing, scheduling, telephone or video conferencing, authentication, database management, word processing, application sharing, accounting, etc. For example, code modules may comprise (not specifically shown) a text-based chat module, a polling module, a video module, a voice over Internet Protocol (VoIP) module, a question-answer (QA) module, a file transfer module, a presentation module, an application/desktop view/share module, and an Internet telephony module. Also, one or more of the application code modules 249 may be dynamic linked library (DLL or ".dll") executable object code files.

Illustratively, in accordance with one or more embodiments described herein, the application/desktop viewing/sharing module (shown as 249*a*) may provide functionality that allows participants to share single applications, multiple applications, or the entire desktop (as understood by those skilled in the art). For the participant who is a presenter, the application viewing/sharing module may maintain a list of currently running processes that are located at the user level of the local machine. The application viewing/sharing module 249*a* may allow selection of one or more participants with which to share the content of those running processes. In one embodiment, e.g., through a complex kernel driver or screen capturing technology, the application viewing/sharing module 249*a* captures Graphics Device Interface (GDI) calls made from the applications to the system, convert and encode the data, and unicast the data to the other participants via the interaction server 300. For each participant that receives the data, the application viewing/sharing module 249*a* may decode the data and display the content. The viewing/sharing module may allow or enable participants to join or exit a session of application sharing, share or not share an application, set sharing privileges, enter or leave annotations, provide a full screen view of shared information, and get information to be shared. (Further details of application viewing/sharing module 249*a* may be found below with reference to the techniques of one or more embodiments described herein. For example, see FIG. 4 below.)

In addition, the video and/or VoIP modules (not explicitly shown) may provide real-time video and/or voice/audio functionality to each participant to provide different functionality to each participant depending on the status and privileges of that participant. For example, for a participant who is a presenter, the modules may capture the video image from a video input device and/or audio from an audio input device, encode the data, and unicast the data to the other participants through the interaction server 300. For each participant that receives the data, the respective modules may decode the data and display/play the content. Thus, the video module may allow or enable various participants to join or exit a video session, edit video segments, or change a video presenter, while the VoIP module may allow or enable various participants to join or exit a VoIP session, pass the microphone to another participant, or display a volume window or control.

Also, the text-based chat module may provide a real-time text messaging function to each participant, allowing or enabling participants to join or exit an online chat, save or print a portion of the chat messaging, load a chat file, or change the privileges of participants involved in the chat. Also, the polling module and/or QA module may provide real-time polling (or question and answer) functionality to each participant.

Further, the file transfer module may provide functionality for transferring files between and among participants in the session. The functions of the file transfer module vary depending on the status and privileges of each participant. For example, the file transfer module may allow a host/presenter to open any directory accessible from the participant device 200 (local machine) and to post a file pointer in a transfer container. Additionally, a presenter can set file transfer privileges for each participant. Any other participant who has been given privileges to download the file can select the file pointer from the list and save the file to his/her local machine. The file transfer module may allow or enable participants to join or exit a transfer, set permissions for the transfer, transfer the file, and save a file.

Moreover, the presentation module may provide functionality that allows participants to share various printable media types (e.g., document, whiteboard, or facsimile). For the participant who is a presenter, the presentation module can convert the selected media content, encode the data, and unicast the data to the other participants via the interaction server 300 (e.g., in a proprietary format). For the each participant that receives the data, the presentation module may decode the data and display the content. The presentation module may allow or enable participants to open, join, or exit a session of a presentation, save, print, or copy a portion of the presentation, change a presenter, get information about the presentation, add or clear annotations from the presentation, choose a font for the text of presentation, and send the presentation to others via facsimile transmission.

Still further, the telephony module may provide a simple user interface for participating in an interactive, on-line telephony session. The telephony module may allow or enable participants to join or exit a telephony session, place or disconnect from a telephony call, invite someone else to join in a telephony call, mute or un-mute a telephony call, and get information for a telephone number.

Those skilled in the art may appreciate that the code modules and their respective functionalities are merely examples, and a participant device 200 may comprise additional or fewer code modules 249 than those described above. As such, code modules may be added or removed per-functionality in order to support a collaborative computing session, whether those functions are needed or optional, and the specific code modules described herein are not meant to limit the scope of the embodiments described herein.

Notably, download engine component 247 may be in communication with activity session component 245, and communications component 246 (e.g., and a cache) to cause various application modules 249 to be downloaded (e.g., automatically) to system 200 under certain circumstances, such as during an initialization process or when the functionality that is supported by such modules is required. Illustratively, the download engine component 247 may be implemented as ActiveX code (ActiveX download engine), Java code (Java download engine), or any other suitable code which may be appropriate for various browser software. (That is, depending on the browser software that the participant is using to access the meeting and depending on browser and system permissions, the appropriate code-version of the download engine component may be invoked.)

Figure 3:
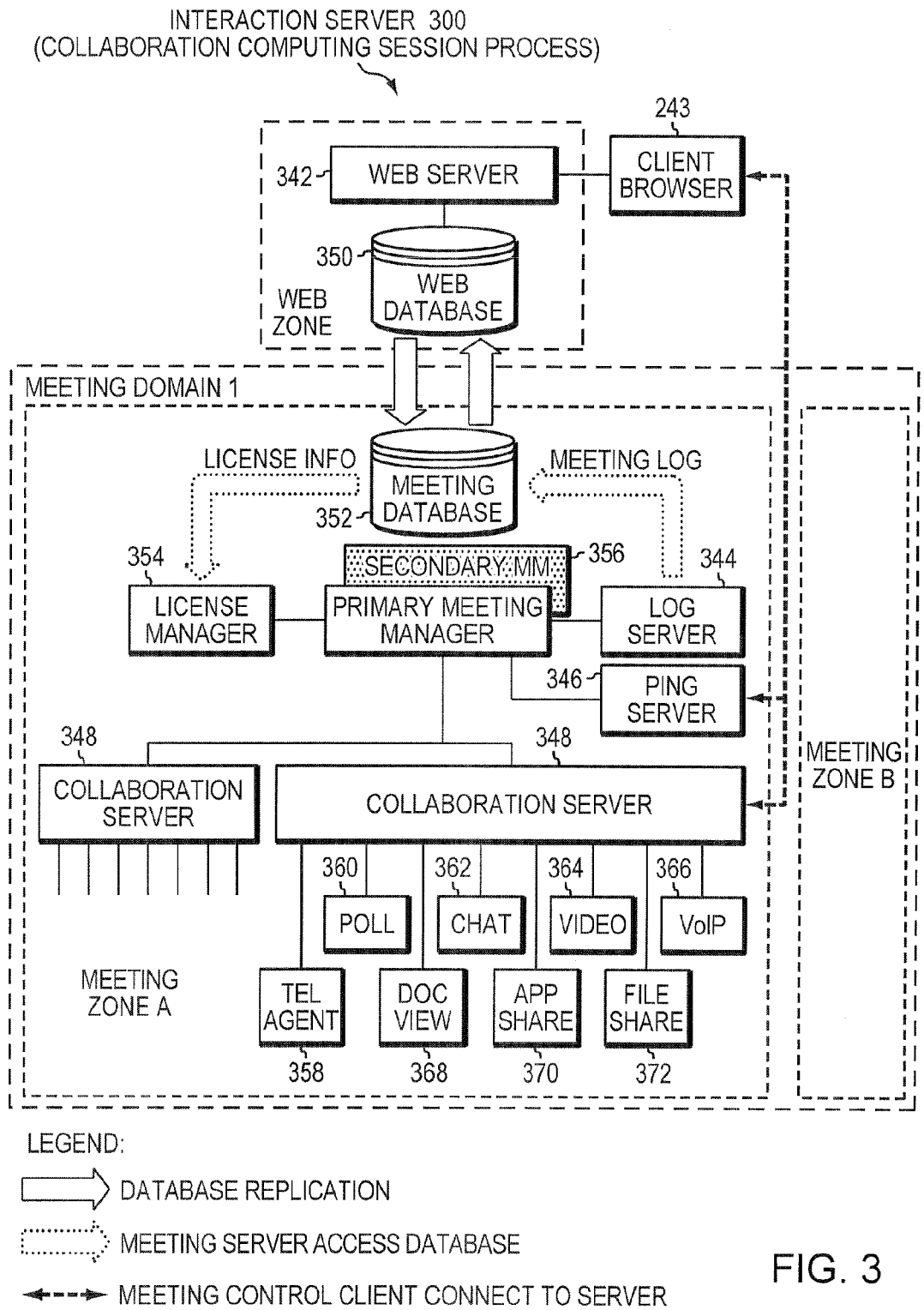
FIG. 3 illustrates an example interaction server.

FIG. 3 illustrates an example implementation for a computer system that may operate as interaction server 300 according to one or more embodiments described herein. Illustratively, in the computer system environment as shown, a number of server computers and databases may be in communication to provide for collaborative meeting or computing. As such, the interaction server 300 and its various components may be referred to as a collaborative computing process 300. (Illustrative details for such a computer system environment may be found in commonly-owned, copending U.S. patent application Ser. No. 09/751,424 entitled "DISTRIBUTED NETWORK SYSTEM ARCHITECTURE FOR COLLABORATIVE COMPUTING," filed on Dec. 29, 2000, by Zhu et al., now published as U.S. Patent Application Publication 2003/0167301 on Sep. 4, 2003.) Notably, while the illustrative embodiment described below shows a collection of servers (e.g., localized and/or distributed), a single server may also operate to perform the functions described herein (e.g., collaborative computing process 300). Thus, "interaction server 300" may comprise, either as a single server or as a collection of servers, one or more memories, one or more processors, one or more network interfaces (e.g., adapted to communicate traffic for a collaborative computing session and also traffic on a communication channel other than the collaborative computing session), etc., as may be appreciated by those skilled in the art.

In particular, referring to the environment shown in FIG. 3, a number of processing facilities, including, for example, one or more of a web server 342, a log server 344, a ping server 346, a collaboration server 348, license manager 354, primary and secondary meeting managers 356, application servers (e.g. telephone agent 358, poll 360, chat 362, video 364, voice over IP 366, document view 368, application share 370, and file share 372) may be integrated with a number of data storage facilities, such as, for example, a web database 350 and a meeting database 352 to implement a system for collaborative meetings over the Internet (e.g., for collaborative computing session "process" 300). As depicted, the processing and database facilities of this environment ("process" 300) may be divided into a web zone and one or more meeting zones for interaction with one or is more client browsers (which may operate on respective participant devices 200).

A web zone may comprise one or more server machines that share a common web database 350. In the web zone, web server 342 may have a unique IP address (which may be associated with a particular website) and may respond to, e.g., Hyper-Text Transport Protocol (HTTP) requests coming to that IP address from client browser 243. Web server 342 serves or supports web pages, while web database 350 may contain static information for the website including site specific data, web pages, and user data.

Illustratively, a meeting zone is a collection of servers and databases that help perform synchronous activity of an on-line collaborative meeting. In a meeting zone, the meeting managers 356 may be servers which communicate with other servers in the meeting zone (e.g., collaboration server 348, log server 344, ping server 346, etc.) to keep track of the on-line meetings in progress in the meeting zone. Meeting managers 356 may log meeting information into meeting database 352. Ping server 346 works with meeting managers 356 to determine a collaboration server 348 that is most suitable for hosting a particular meeting; it may act as a load balancer for the meeting service. Collaboration servers 348 may handle all real time control and communication during an online collaborative meeting. The application servers (e.g., servers 358 through 372) may support specific features that may be available as part of an on-line collaborative meeting, such as, for example, telephony, polling, chatting, video, voice over IP, document review, application sharing, and file sharing. Also, license manager 354 may keep track of and enforce licensing conditions and charges for the meeting. Further, the log server 344 may keep track of meeting logs, and meeting database 352 may maintain at least a portion of the transient data required to conduct and keep track of on-line meetings. This data may include, for example, site and user information that would be required to establish and conduct a meeting.

Application Sharing Between Presenter and Attendees/ Viewers

Conventional application sharing techniques capture a predefined portion of the presenter's computer screen (e.g., the entire screen or a rectangle within the entire screen) and provide the image within the predefined portion of the presenter's computer screen to the viewer (e.g., "desktop sharing"). All of the applications that have windows positioned within the predefined portion of the presenter's computer screen are captured by the presenter's computer, transmitted to the viewer's computer, and displayed on the viewer's computer screen whether or not the presenter intended to share these application windows with the viewer. As a result, the presenter may inadvertently share an application window with a viewer that the presenter does not intend to share with the viewer. By using "application sharing," however, these disadvantages may be overcome by sharing or not sharing particular application windows as selected by the presenter. For instance, a shared application window refers to a window belonging to an application that a presenter intends to share with a viewer, and the term non-shared application window refers to a window belonging to an application that a presenter does not intend to share with a viewer. (Note that references to a window are directed to an area utilized to display the content, and references to a desktop are directed to an entire portion of a display area of a corresponding device.)

Figure 4:
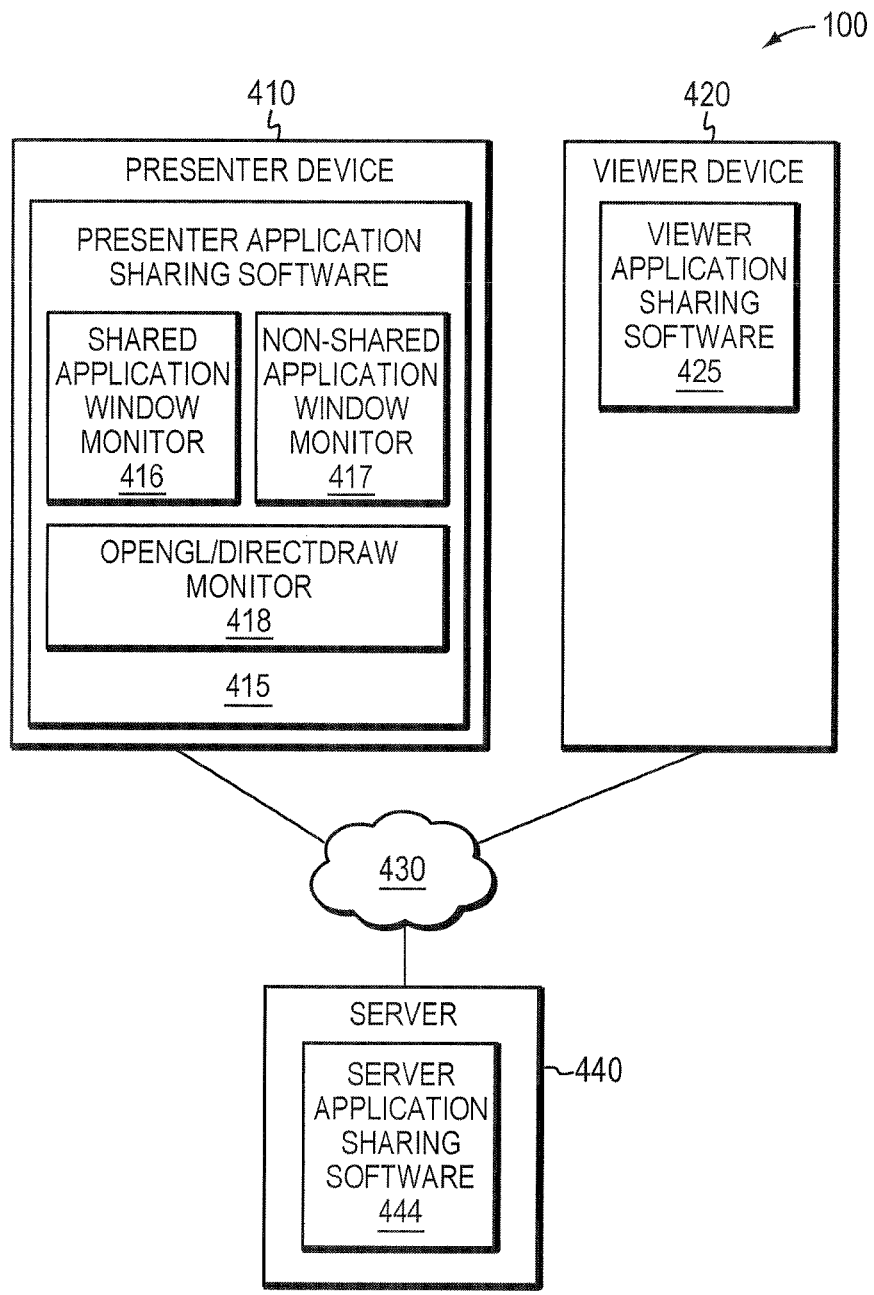
FIG. 4 illustrates an example computer network for application sharing.

FIG. 4 illustrates an alternative view of network 100 (as shown in FIGS. 1-3) in accordance with application sharing, generally. For instance, code module 249a, application/desktop viewing/sharing, may be (for application viewing/sharing only) represented as further detailed in FIG. 4. That is, code module 249a of a presenter device 410 may comprise presenter application sharing software 415, which may be any type of suitable software that enables presenters and viewers to share applications, documents, or the like. Presenter application sharing software 415 may comprise the following software components: shared application window monitor 416, non-shared application window monitor 417, and OpenGL/DirectDraw monitor 418. The function of each of these software components is discussed in detail below. Presenter application sharing software 415 may also include other software components that are not shown or discussed for clarity.

Viewer device 420 also includes viewer application sharing software 425 (as a detailed embodiment of code module 249a), which can be similar to or the same as presenter application sharing software 415. Viewer application sharing software 425, among is other things, receives images of application windows from the presenter's computer and displays the images on the viewer's computer screen.

According to application sharing, a presenter may select which particular applications/windows to share with the one or more attendees/viewers of a collaboration session. The presenter's device (e.g., presenter application sharing software 415) may then transmit shared applications to the viewer's device (e.g., to viewer application sharing software 425) over network 430, with non-shared applications not transmitted, and overlapping regions (where the non-shared applications cover the shared applications) being blocked from transmission. (Notably, while the techniques described herein reference presenter application sharing software 415 as operating to control the sharing/non-sharing of application windows, the server application sharing software 444 of server 440/300 may instead be configured to receive all viewable content from the presenter, and to limit the transmission of non-shared or covered shared application windows, accordingly.)

Figure 5A:
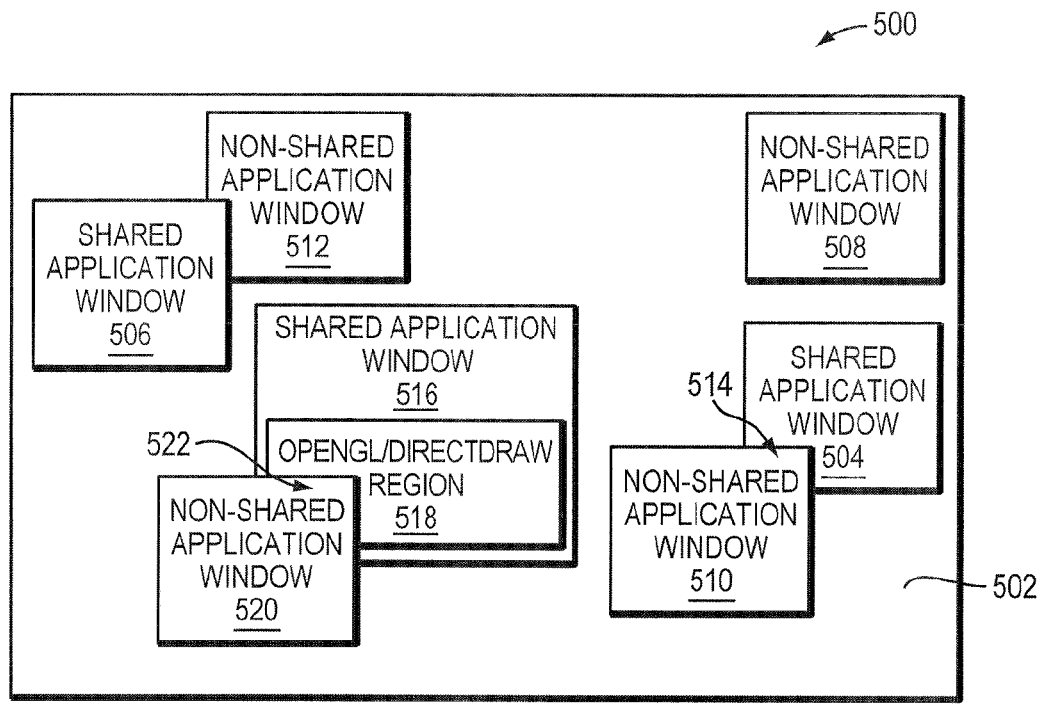
FIG. 5A illustrates an example presenter device display with application sharing.
Figure 5B:
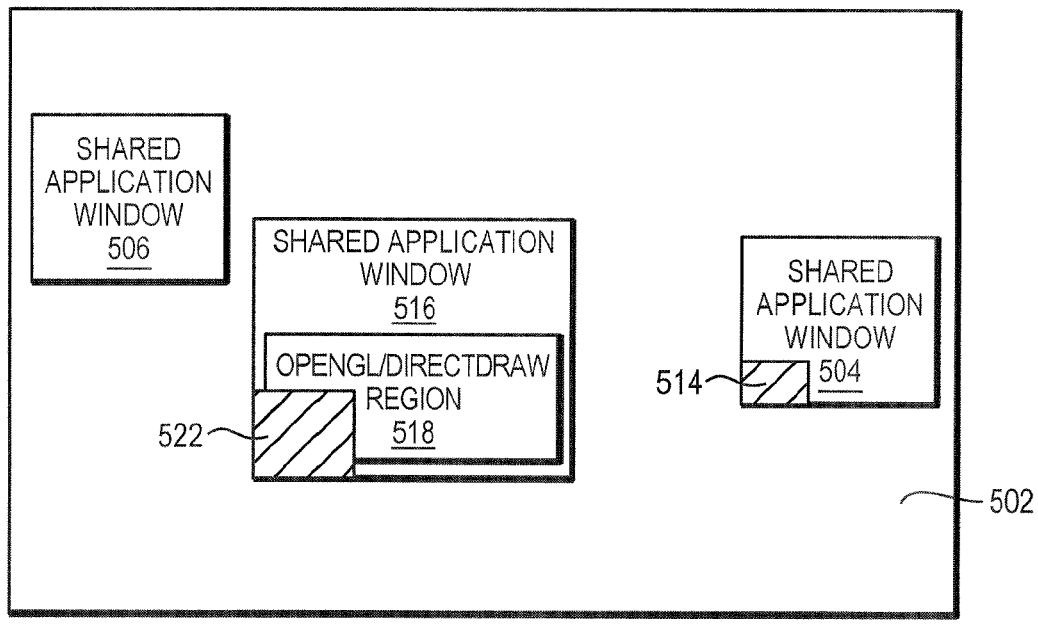
FIG. 5B illustrates an example attendee/viewer device display with application sharing.

Illustratively, FIGS. 5A and 5B show an example of how application sharing (e.g., application-based screen sampling) may operate during a data conference. FIG. 5A shows a presenter's computer screen 500 having background region 502, shared application windows 504 and 506, non-shared application windows 508, 510, and 512, and overlapping region 514. In addition, shared application window 516 may include an OpenGL/DirectDraw region 518, which is a region drawn by OpenGL/DirectDraw (respectively). The region of shared application window 516 outside of region 518 is referred to as the non-OpenGL/DirectDraw region, which is a region that is not drawn by OpenGL/DirectDraw. Non-shared application window 520 overlaps shared application window 516 at overlapping region 522.

Based on application sharing, therefore, FIG. 5B shows a viewer's computer screen 500', which has background region 502', shared application windows 504', 506', and 516', and overlapping regions 514' and 522'. In particular, a portion of application window 506' is obscured by overlapping region 514', and a portion of OpenGL/DirectDraw region 518' and non-OpenGL/DirectDraw region 518' of shared application window 516' is obscured by overlapping region 522'.

For example, to create FIGS. 5A and 5B, once a data conference has started, the presenter may select one or more applications to share with a viewer. Presenter application sharing software 415 receives the presenter's selections and then performs application based sharing as follows with reference to FIG. 5.

Figure 6:
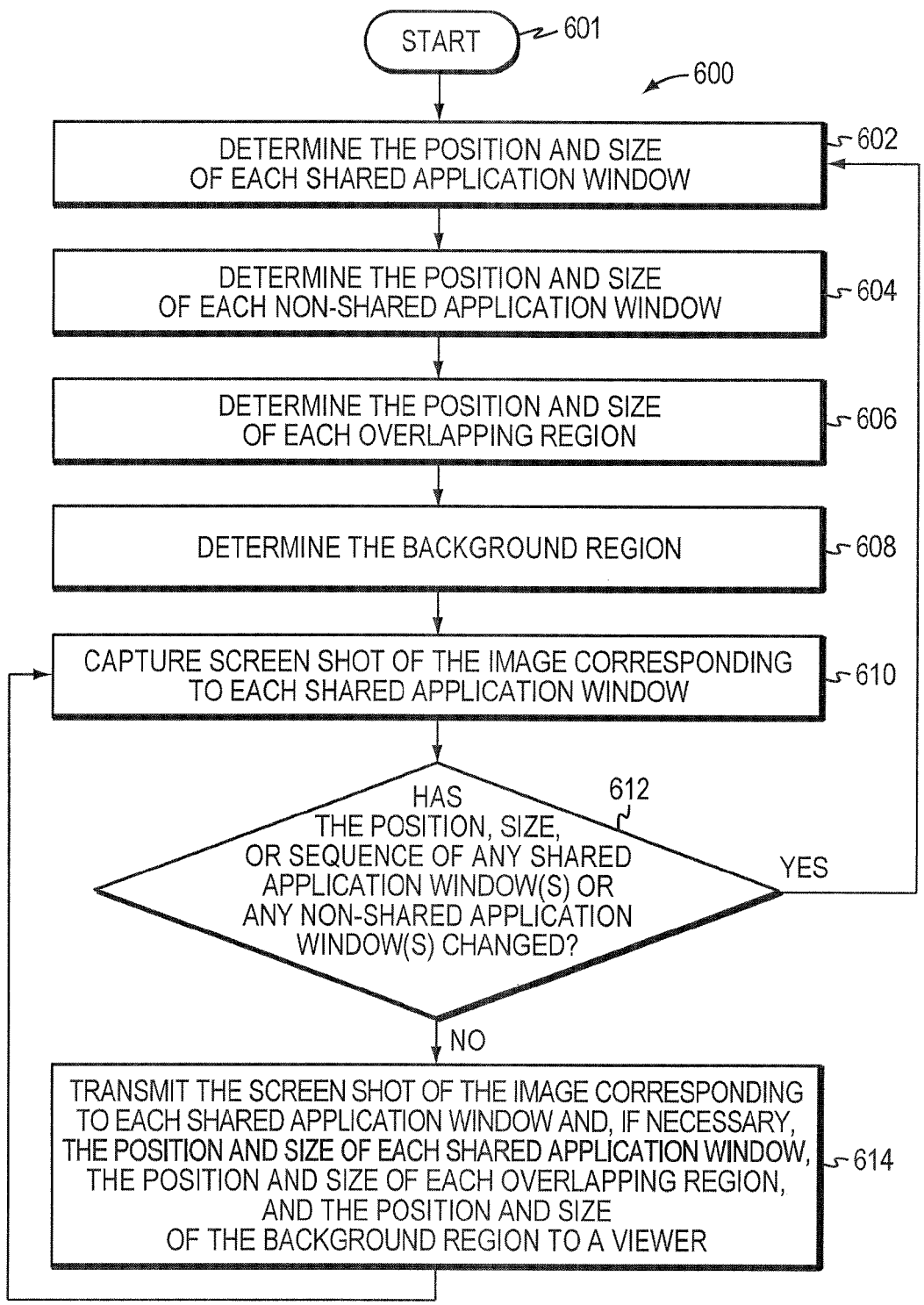
FIG. 6 illustrates an example procedure for application sharing.

In particular, FIG. 6 is a flowchart of an example procedure 600 for application-based screen sampling, according to one or more embodiments herein. (Procedure 600 assumes that the presenter has pre-defined or pre-designated an application as a shared application during the data conference, as mentioned above.) Procedure 600 begins in step 601, and continues to step 602, where the position and the size of each shared application window is determined, e.g., by shared application window monitor 416. If the shared application only has one window, the position and size of this window is determined. If the shared application has several windows, the position and size of each of these windows is determined.

The position and size of each shared application window may be determined dynamically by monitoring and intercepting function calls made by the shared application to a graphics display subsystem. For instance, the graphics display subsystem receives the function calls and, in response, causes appropriate graphics or images to be drawn on the presenter's computer screen 500. For example, if the application is running on a Microsoft Windows based computer, the application may call Graphics Device Interface (GDI) functions to draw images on the presenter's computer screen. The function calls provide information that identifies which application a particular window belongs to, the position of the window, and the size of the window. Thus, by monitoring and intercepting the function calls, the position and size of a window can be determined.

Notably, in step 602, the position and the size of each OpenGL and/or DirectDraw regions of a shared application window may also be determined (e.g., by OpenGL/DirectDraw monitor 418). For instance, the OpenGL/DirectDraw regions are the areas within the shared application windows that are drawn by OpenGL/DirectDraw (respectively).

OpenGL is a well-known application program interface (API) that is used by applications to draw graphics (e.g., 2D and 3D graphics) on a presenter's computer screen. To generate graphics using OpenGL, an application first launches OpenGL. The application then calls OpenGL functions. As a result of these function calls, OpenGL internally calls glFlash, glDraw, and/or glEscape, which are OpenGL subsystems. Finally, the glFlash, glDraw, or glEscape subsystems cause the graphics to be drawn on the presenter's computer screen.

The position and size of the OpenGL regions of each shared application window can be determined dynamically by monitoring and intercepting OpenGL function calls made by the application. For example, the position and size of the OpenGL regions of each window belonging to a shared application can be determined dynamically by monitoring and intercepting function calls to the glFlash, glDraw, and glEscape subsystems of OpenGL. Thus, by monitoring and intercepting the function calls made to OpenGL or to the glFlash, glDraw, and/or glEscape subsystems of OpenGL, the position and size of each OpenGL region within a shared application window can be determined.

In addition, DirectDraw is a well-known Windows-based API used to create graphics. Many applications use DirectDraw to draw graphics on a presenter's computer screen. Unlike OpenGL and other general windows APIs, DirectDraw is COM based. To generate graphics using DirectDraw, an application first launches DirectDraw. The application then gets the COM interfaces corresponding to DirectDraw. Next, the application calls the DirectDraw COM interface to access the DirectDraw functions. Finally, the DirectDraw COM interface calls an internal function to render the graphics.

The position and size of each DirectDraw region of each shared application window can be determined by monitoring the DirectDraw COM interface. As mentioned above, DirectDraw is not like OpenGL and other general windows APIs; DirectDraw is COM based. Since Direct Draw is COM based, it is not possible to monitor function calls made by the application directly to DirectDraw to determine the position and size of each DirectDraw region of each shared application window. However, Applicant has discovered that the position and size of each DirectDraw region of each shared application window can be determined by dynamically monitoring the, DirectDraw COM interface and intercepting information that defines the position and size of each DirectDraw region of each shared application window. (It should also be recognized that the procedure may be modified so that any COM interface, not just the DirectDraw COM interface, can be monitored).

In step 604, the position and the size of each non-shared application window is determined, e.g., by non-shared application window monitor 417. If the non-shared application only has one window, the position and size of this window is determined. If the non-shared application has several windows, the position and size of each of these windows is determined. The position and size of each non-shared application window may be determined dynamically by monitoring and intercepting function calls made by the non-shared application to a graphics display subsystem (as described in step 602 above).

In step 606, the position and size of each overlapping region is determined. An overlapping region is a region on the presenter's computer screen where a non-shared application window overlaps a shared application window, such as, e.g., a non-OpenGL region or an OpenGL region of a shared application window or a non-DirectDraw region or a DirectDraw region of a shared application window (generally, "shared application windows" herein). If none of the non-shared application windows overlap shared application windows, there are no overlapping regions. Conversely, if multiple non-shared application windows overlap shared application windows, there are multiple overlapping regions. The position and size of each overlapping region can be determined by comparing the position and size of each shared application window with the position and size of each non-shared application window.

In step 608, the background region is determined, which is the area on the presenter's computer screen that is not occupied by a shared application window. The background region includes areas of the presenter's computer screen that are occupied by non-shared application windows, or not occupied by any application windows. The background region can be determined by comparing the position and size of each shared application window (e.g., non-OpenGL and the OpenGL regions or non-DirectDraw and the DirectDraw regions of each shared application window) with the position and size of the presenter's entire computer screen.

In step 610, a screen shot of the image corresponding to (or "within") each shared application window is captured so that it can be provided to the viewer. This step may be performed periodically (e.g., five times per second) so that changes to the image on the presenter's computer screen are quickly reflected on the viewer's computer screen. Illustratively, the screen shot of the image corresponding to each shared application window can be captured by capturing portions of the frame buffer on the presenter's computer that correspond to shared application windows. Since step 602 determines the sizes and positions of the shared application windows, the location of the shared application windows within the frame buffer are known.

In step 612, the position, size, and sequence of each shared application window and each non-shared application window is monitored. If the position, size, or sequence of a shared application window or a non-shared application window changes, then procedure 600 returns to step 602. If the position, size, and sequence of the shared application windows and the non-shared application windows do not change, then procedure 600 proceeds to step 614. The position, size, and sequence of each shared application window and each non-shared application window on the presenter's computer screen can be dynamically monitored by monitoring and intercepting function calls made by the shared and non-shared applications to a graphics display subsystem (as described in step 602 above).

In step 614, the screen shot of the image corresponding to each shared application window and, if necessary, the position and size of each shared application window, the position and size of each overlapping region, and the position and size of the background region is transmitted to the viewer's computer, e.g., via server 440 ("server application sharing software" 444). If the position, size, and sequence of the shared application windows and the non-shared application windows have not changed since the previous screen shot was transmitted to the viewer's computer, then the position and size of the shared application windows, the position and size of the overlapping regions, and the pots sition and size of the background region do not have to be retransmitted to the viewer's computer. On the other hand, if the position, size, or sequence of the shared application windows or the non-shared application windows have changed since the previous screen shot was transmitted to the viewer's computer, then the updated position and size of the shared application windows, the updated position and size of the overlapping regions, and/or the updated position and size of the background region are transmitted to the viewer's computer. This ensures that the viewer's computer screen accurately reflects what is currently displayed on the presenter's computer screen. Prior to transmission, the screen shot of the images corresponding to each shared application window can be compressed using image compression techniques such as GZIP or JPEG.

Once the viewer's computer has received the screen shot of the image corresponding to each shared application window, and if transmitted, the position and size of each shared application window, the position and size of each overlapping region, and the position and size of the background region, viewer application sharing software 425 can display the image on the viewer's computer screen 500'. To accomplish this, viewer application software 425 performs the following process. First, viewer application software 425 generates or draws a background region based on the position and size of the background region. The background region can be filled or painted with an arbitrary color or image. Second, viewer application software 425 generates or draws a window corresponding to the position and size of each shared application window. Third, viewer application sharing software 425 generates or draws the image corresponding to each shared application window inside of each shared application window. Fourth, viewer application software 425 generates or draws an overlapping region corresponding to the position and size of each overlapping region. The overlapping region can be filled or painted with an arbitrary color or image. Those skilled in the art will understand the above details are merely representative examples, and that other application sharing techniques may be used, accordingly.)

Application sharing (application-based screen sampling) thus allows a presenter to define or designate applications as shared applications and non-shared (or "unshared") applications. Windows belonging to shared applications and non-shared applications are monitored and only windows belonging to shared application windows are displayed on a viewer's computer screen. As noted, however, when selectively sharing applications, it may be difficult for the presenter to easily know which application windows have been shared or not, thus which application windows are being viewed by each of the attendees. For instance, conventional application sharing may include a list of shared applications, only a single shared application/region, or may have a small portion of the windows having an inserted text display (e.g., a "shared" or "non-shared" indication/title "hanged" along a top or bottom margin of both shared and non-shared windows). In this manner, a presenter may easily lose track of which applications are shared or not shared during a busy or involved collaboration session, and may inadvertently share an application window without realizing that it has been shared and is being seen by the attendees/viewers. Not only may this cause cumbersome meeting activity and presenter (and attendee) frustrations, but it may also present security problems when accidentally (and unknowingly) sharing applications with secure/private information contained therein.

Distinguishing Shared and Non-shared Applications

According to embodiments described herein, a presenter device participates in an online collaborative computing session, and a determination is made to whether application windows on the presenter device are shared or non-shared, where shared application windows have a viewable portion on a display of the presenter device that may be transmitted to one or more attendee devices of the online collaborative computing session. Each of the one or more non-shared application windows on the display of the presenter device may be grayed out, such as by covering the non-shared application windows with a semi-transparent window (e.g., sized and positioned to a total area of the display of the presenter device subtracted by an area having the viewable shared application windows).

Illustratively, certain techniques described herein (e.g., the determination and the graying out) may be performed by presenter device 410 or interaction server 440/300, such as in accordance with presenter application sharing software 415 or server application sharing software 444, respectively. In particular, these processes and/or services may be configured to operate in accordance with certain techniques as described herein, such as dependent upon whether the images (viewable shared application windows) for transmission to viewer/attendee devices are rendered by the presenter device or server supporting the online collaborative computing session.

Operationally, the presenter device 410 may participate in an online collaborative computing session as described in detail above. Also, in accordance with application sharing, the presenter may select one or more applications to be shared or non-shared (unshared) among attendees of the online collaborative computing session, such as sharing a presentation application having slides to be presented during a meeting, but not sharing an email application executing on the presenter's device. Accordingly, the presenter device (sharing software 415 or server software 444) may thus determine the shared and/or non-shared application windows on the presenter device. In particular, as described above with reference to FIGS. 5A-6, the viewable portions of the shared application windows on a display 500 of the presenter device that are to be (or are being) transmitted to attendee devices (500') may also be determined.

According to one or more embodiments described herein, each non-shared application window on the display of the presenter device may be "grayed out," such that the presenter viewing the non-shared application windows will see a distinctly different colorization of the viewed application. For instance, as may be appreciated by those skilled in the art, graying out describes displaying an application window with a light shade of gray, e.g., overlaid upon the window, or having grayscale colors replace full colors within the window. In this manner, the application window may appear lighter or darker than a conventional window, and in particular, than a viewable shared application window according to the techniques described herein. Notably, in this sense, the use of the phase "graying out" need not imply the color gray, a grayscale view, or any other action associated with the color gray. Instead, its use implies any technique, known or otherwise, that may be used to change the appearance of an application window, e.g., lighter or darker, such that a presenter may be made aware of the fact that these changed appearance windows (e.g., viewable non-shared application windows) are different from non-changed appearance windows (e.g., viewable shared application windows).

Figure 7A:
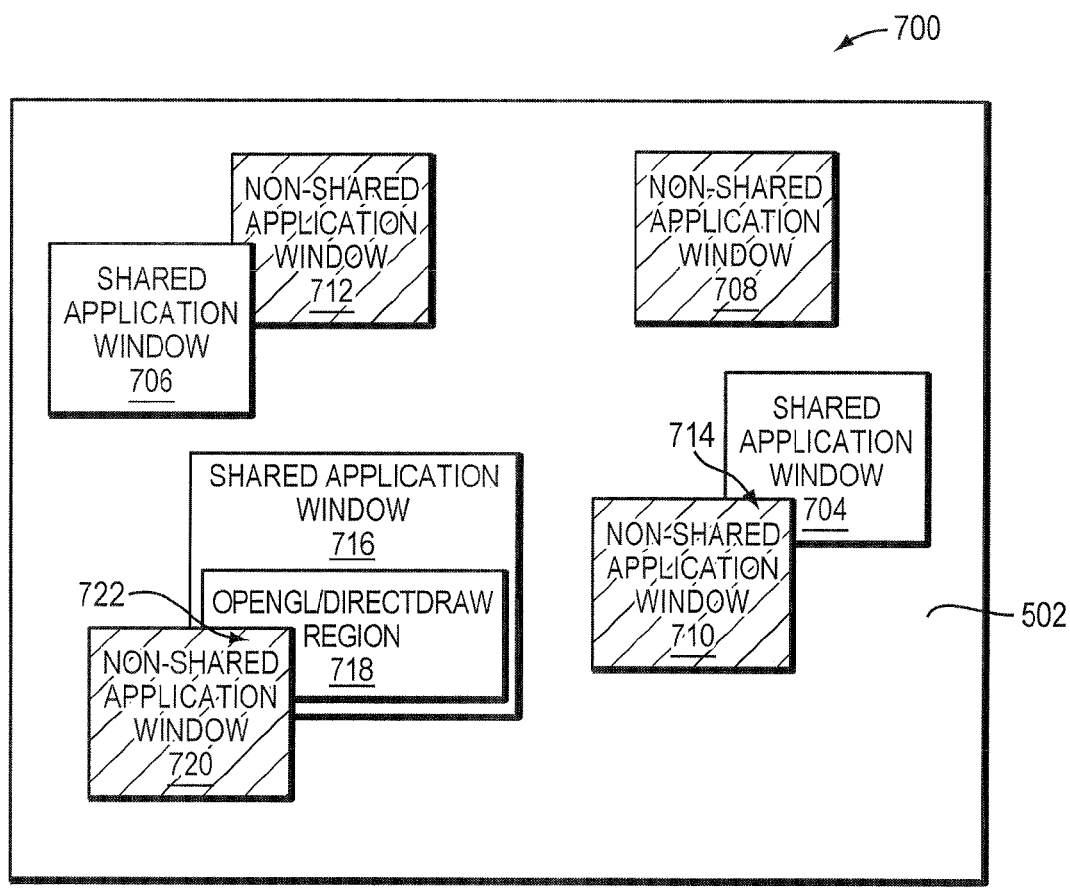
FIG. 7A illustrates another example presenter device display with application sharing.

FIG. 7A illustrates an example presenter device display 700, similar to display 500 of FIG. 5A, showing viewable non-shared application windows "grayed out." For instance, non-shared windows 708, 710, 712, and 720 are shown grayed out, and shared windows 704, 706, and 716 are shown normally. In this manner, the presenter may easily distinguish shared applications from non-shared applications based on the shading (graying) of the application windows.

Figure 7B:
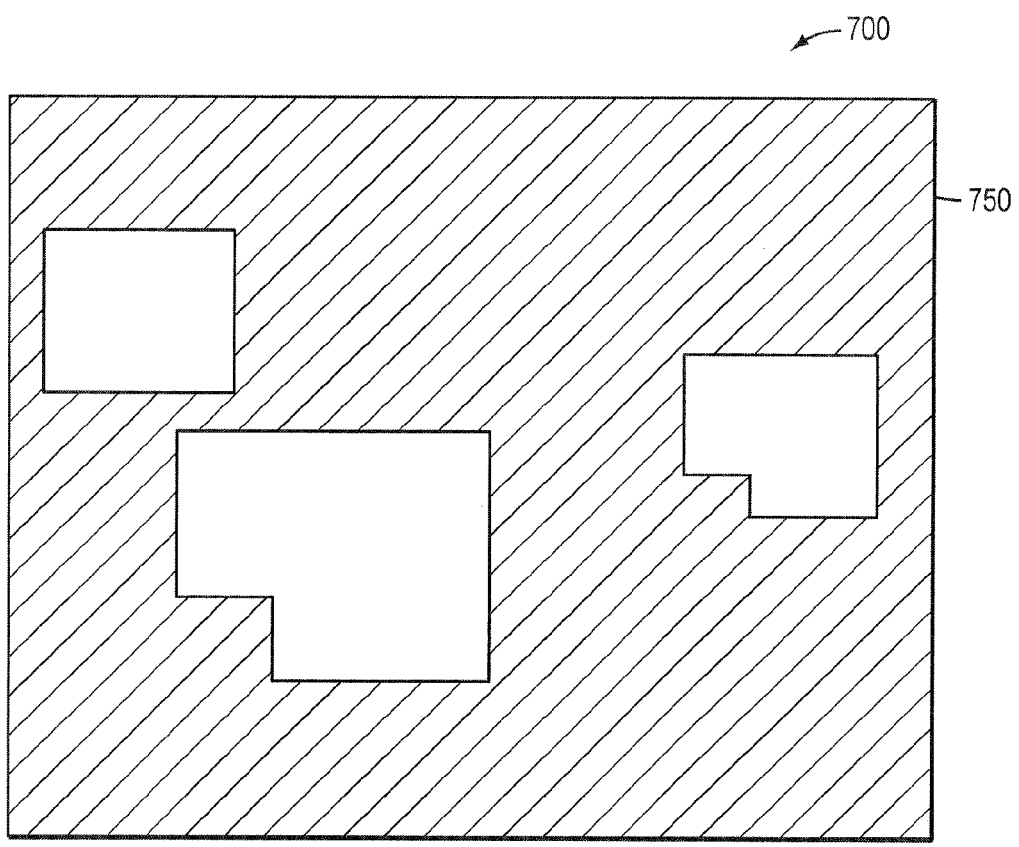
FIG. 7B illustrates an example semi-transparent window.

According to an illustrative embodiment described herein, one technique that may be used to gray out the non-shared applications is to cover the non-shared application windows with a semi-transparent window. For instance, FIG. 7B illustrates an example presenter device display 700 having a semi-transparent window 750 in accordance with one or more embodiments herein. In particular, the presenter device (e.g., application sharing software 415) may determine an area of the display 700' of the presenter device that has viewable shared application windows (704, 706, and 716), and may corresponding subtract that area (e.g., comprising multiple separate areas) from the total area of the presenter device display (700', e.g., the presenter's desktop) to determine the size and position of the semi-transparent window 750 (note that the regions not covered by window 750 correspond to viewable shared application windows of FIG. 7A). Once the area is determined, the semi-transparent window may be generated according to the determined size and position, and overlaid on top of the non-shared applications (i.e., on top of everything other than the viewable shared application windows).

For example, as described above in step 608 of FIG. 6, the size and position of the semi-transparent window may be determined in a similar manner to the background region, which is the area on the presenter's computer screen that is not occupied by a shared application window. That is, the semi-transparent window region may include areas of the presenter's computer screen that are occupied by non-shared application windows, or not occupied by any application windows, and may be determined by comparing the position and size of each shared application window (e.g., non-OpenGL and the OpenGL regions or non-DirectDraw and the DirectDraw regions of each shared application window) with the position and size of the presenter's entire computer screen.

Illustratively, the semi-transparent window may be configured with one-half transparency (e.g., a "half transparent window style") as may be appreciated by those skilled in the art. For instance, the semi-transparent window may have a gray coloring with a transparency level between 1% and 99%, preferably between 25% and 75% to allow the presenter to still see the non-shared application windows, yet still distinguishing the non-shared windows from viewable shared application windows. Other coloring may also be used and made transparent, such as white, black, yellow, green, etc. Notably, while the "display" 700' of the presenter device is shown as the entire viewable area of a display device (e.g., a desktop), the techniques described herein are equally as applicable to a portion of the entire viewable area designated for the online collaborative computing session (e.g., within a designated online collaborative computing session application window).

In the event that a semi-transparent window is overlaid on top of the non-shared application windows (and any non-occupied space/background other than viewable shared application windows), other provisions may be made to allow seamless operation. In particular, input from presenter interface devices (e.g., a mouse or keyboard, to I/O interface 215) may be restricted from interfacing the semi-transparent window, and such inputs may be passed through the semi-transparent window to a corresponding covered non-shared application window beneath the semi-transparent window. In this manner, all presenter controls/inputs are passed to the non-shared application windows (e.g., to a non-shared email application) without being intercepted by an overlaying window, as may be appreciated by those skilled in the art. (In other words, with the exception of viewable shared applications, the remainder of the display 700 is an "overlapping region" with respect to the overlaid semi-transparent window, thus provisioning is made to allow control to pass through the semi-transparent window, accordingly.)

Figure 7C:
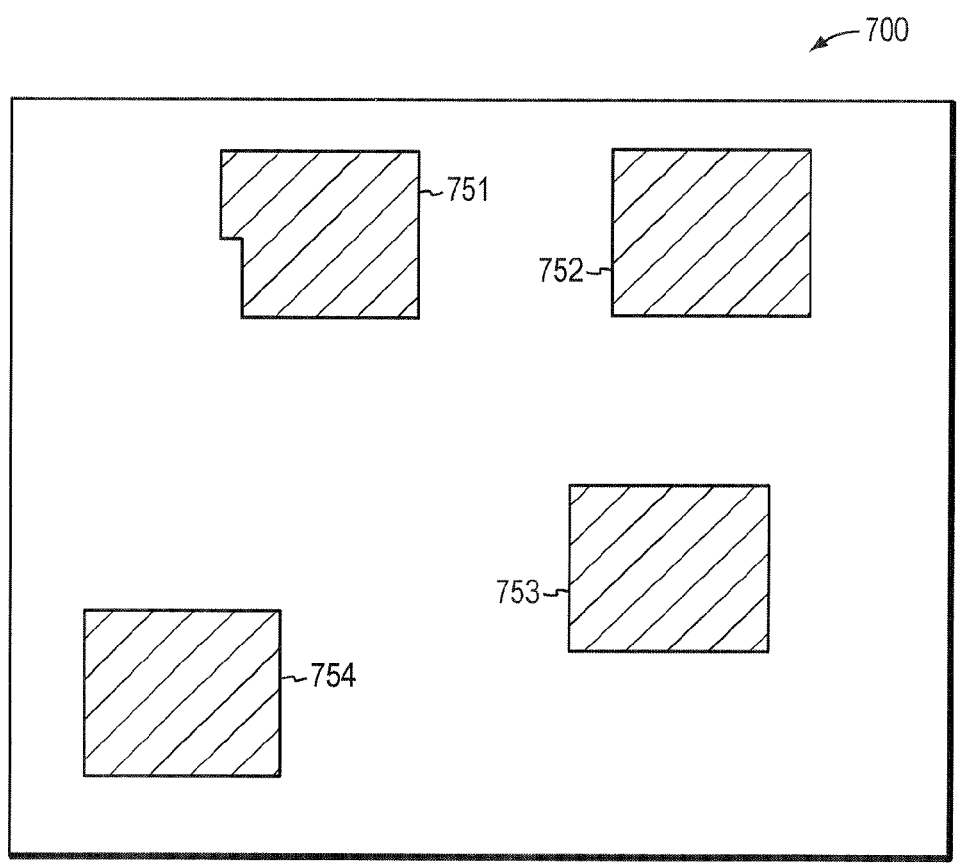
FIG. 7C illustrates another example semi-transparent windows.

Alternatively, rather than generating the semi-transparent window based on the viewable shared application windows, one embodiment described herein may instead determine an area of the viewable non-shared application windows on the presenter display. In this embodiment, the semi-transparent window 750 may be generated with a size and position equal to the area having the viewable non-shared application windows. Accordingly, in the event there is a plurality of areas having viewable non-shared application windows, then a corresponding plurality of semi-transparent windows sized and positioned to respective areas should be generated. FIG. 7C illustrates this concept, where semi-transparent windows 751-754 are generated for respective viewable non-shared application windows (noting the overlapping portions where a viewable shared application covers the non-shared window is not included within the semi-transparent window 751).

Figure 8:
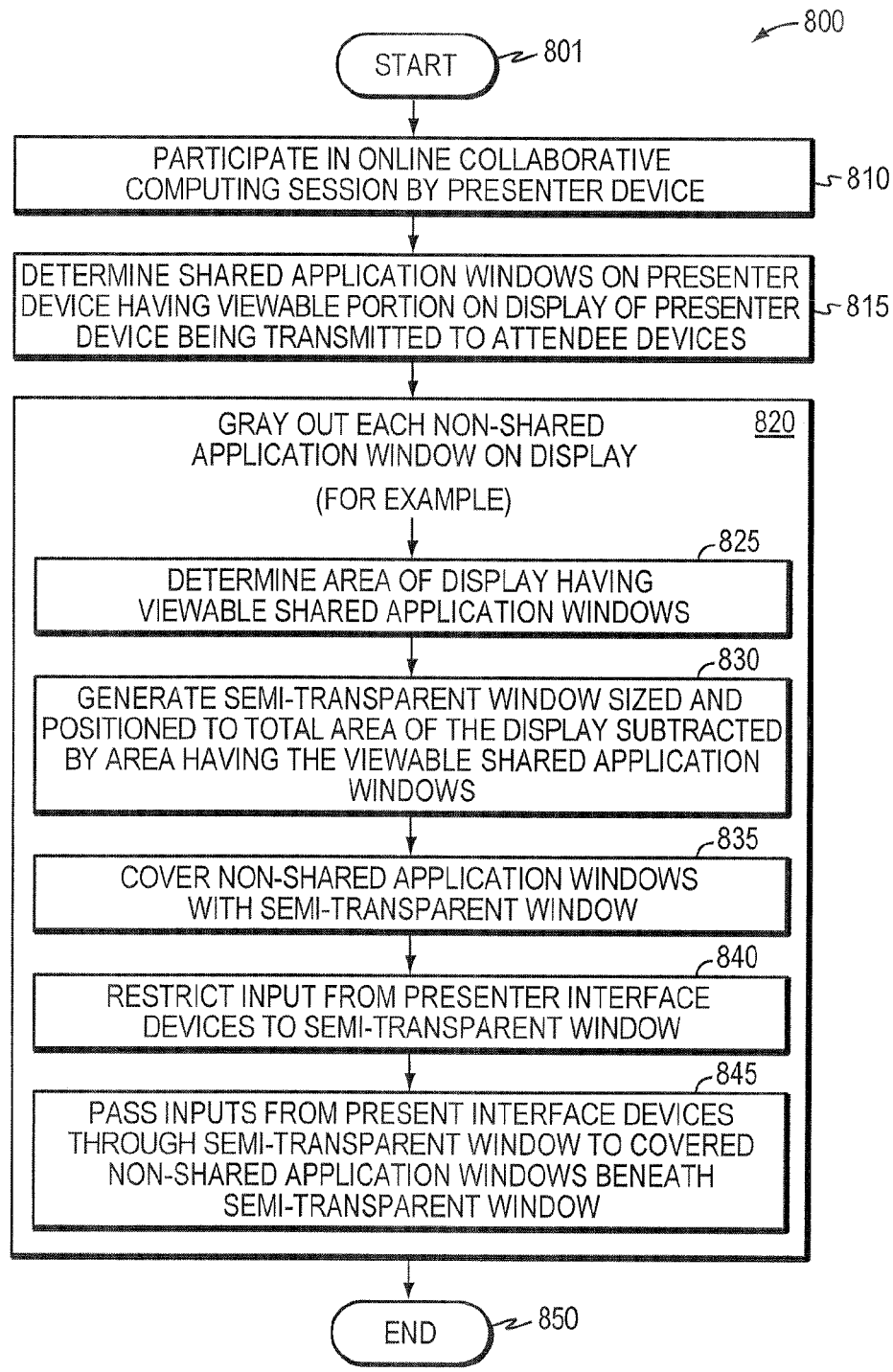
FIG. 8 illustrates an example procedure for distinguishing shared and non-shared application windows in collaborative computing sessions.

FIG. 8 illustrates an example procedure for distinguishing between shared and non-shared application windows on a presenter device in collaborative computing sessions in accordance with one or more embodiments described herein. The procedure 800 starts at step 805, and continues to step 810, where a presenter device participates in online collaborative computing session. In step 815, the presenter device 410 (or the server 440) determines one or more shared application windows on the presenter device having viewable portion on a display (e.g., 500) of the presenter device being transmitted to attendee devices (e.g., to display 500'). In step 820, the non-shared application windows on the display are grayed out, as described above.

For example, according to one or more embodiments described herein, step 820 may further comprise steps 825-845, where in step 825, an area of the display having viewable shared application windows is determined. Then, in step 830, a semi-transparent window (e.g., 750) may be generated that is sized and positioned to the total area of the display subtracted by the area having the viewable shared application windows. This semi-transparent window may then cover the non-shared application windows in step 835, where inputs from presenter interface devices a restricted from the semi-transparent window in step 840, and are passed through to the covered non-shared application window(s) beneath semi-transparent window in step 845, as described above.

The procedure 800 then ends in step 850, such as when the collaborative computing session is complete, or when the presenter is otherwise no longer sharing any applications. Notably, in the event changes are made to which application windows are shared, the procedure may return to step 815 to determine those shared or non-shared windows, and to continue by responding appropriately in step 820.

Advantageously, the novel techniques described herein distinguish between shared and non-shared application windows on a presenter device in collaborative computing sessions in a computer network. By graying out the non-shared application windows (e.g., with a covering semi-transparent window), the novel techniques allow a presenter to know very clearly which windows have been shared or not, thus allowing the presenter to control the shared or non-shared windows easily and effectively. In particular, the novel techniques allow the presenter to distinguish between shared and non-shared applications when sharing more than one application.

While there have been shown and described illustrative embodiments that distinguish between shared and non-shared application windows on a presenter device in collaborative computing sessions in a computer network, it is to be understood that various other adaptations and modifications may be made within the spirit and scope of the present invention. For example, the embodiments have been shown and described herein for use with web browser-based applications, such as online conference meeting sites. However, the embodiments of the invention in their broader sense are not so limited, and may, in fact, be used with other applications/sessions, as may be appreciated by those skilled in the art.

As noted above, the embodiments described herein apply to a number of participants interacting in an on-line, interactive, or collaborative setting, such as for a meeting, training or education, support, or any other event that may require a number of participants to work together, interact, collaborate, or otherwise participate, such as web conferences, on-line meetings, etc. Thus, as used herein, the phrase "collaborative computing session" is used to describe these settings/events, particularly where a number of participant computers/devices collaborate in an established session, as may be appreciated by those skilled in the art. Specifically, a collaborative computing session as used herein is distinguished from groups of computers "collaborating" for computational (e.g., processing or memory) or computerized measuring and/or monitoring purposes, such as those for use with tracking stock markets, measuring parameters (e.g., field instruments), network devices (e.g., routers, switches, storage devices, etc.), or other types of devices and associated "sessions." That is, a collaborative computing session as used herein defines a session among participant devices 200 and an interaction server 300 for use with sharing/distributing video and/or audio for presentations, meetings, or other personally collaborative events.

The foregoing description has been directed to specific embodiments of this invention. It will be apparent, however, that other variations and modifications may be made to the described embodiments, with the attainment of some or all of their advantages. For instance, it is expressly contemplated that the components and/or elements described herein can be implemented as software, including a computer-readable medium (e.g., disks/CDs/etc.) having program instructions executing on a computer, hardware, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method, comprising:
    participating in an online collaborative computing session by a presenter device, wherein either an entire viewable area of a display device or a portion of the entire viewable area is designated for transmission to one or more attendee devices for the online collaborative computing session;
    determining one or more shared application windows on the presenter device;
    determining an area of the display of the presenter device having viewable shared application windows;
    determining a plurality of areas of the display of the presenter device having viewable non-shared application windows;
    generating a plurality of semi-transparent windows sized and positioned to the areas having the viewable non-shared application windows;
    graying out each of one or more non-shared application windows on the display of the presenter device by covering the non-shared application windows with overlaid semi-transparent windows, wherein the semi-transparent windows are sized and positioned to a total area of the display of the presenter device subtracted by the area having the viewable shared application windows;
    restricting input from one or more presenter interface devices associated with the presenter device to the plurality of semi-transparent windows; and
    passing inputs from the one or more presenter interface devices through the semi-transparent window to a covered non-shared application window beneath the semi-transparent window.

2. The method as in claim 1, wherein restricting input from one or more presenter interface devices comprises:
    restricting input from one or more of a mouse and a keyboard.

3. The method as in claim 1, further comprising:
    configuring the plurality of semi-transparent windows with one-half transparency.

4. The method as in claim 1, further comprising:
    performing the determining and graying out on the presenter device.

5. The method as in claim 1, further comprising:
    performing the determining and graying out on a server supporting the online collaborative computing session.

6. The method as in claim 1, wherein the entire viewable area comprises a plurality of application windows, further comprising:
    receiving a selection at the presenter device of which of the plurality of the application windows should be shared.

7. The method as in claim 1, wherein the entire viewable area comprises a plurality of application windows, further comprising:
    pre-designating which of the plurality of the application windows should be shared prior to initiating the online collaborative computing session at the presenter device.

8. The method as in claim 1, further comprising:
    determining the position and size of each shared window application by dynamically monitoring and intercepting function calls made by the shared application to a graphics display subsystem.

9. The method as in claim 8, further wherein determining the position and size of each shared window application comprises:
    determining position and size of OpenGL regions of each shared application window by intercepting OpenGL function calls.

10. Software encoded in one or more non-transitory computer-readable storage media and when executed operable to:
    participate in an online collaborative computing session as a presenter device, wherein either an entire viewable area of a display device or a portion of the entire viewable area is designated for transmission to one or more attendee devices for the online collaborative computing session;
    determine one or more shared application windows on the presenter device;
    determine an area of the display of the presenter device having viewable shared application windows;
    determine a plurality of areas of the display of the presenter device having viewable non-shared application windows;
    generate a plurality of semi-transparent windows sized and positioned to the areas having the viewable non-shared application windows;
    gray out each of one or more non-shared application windows on the display of the presenter device by covering the non-shared application windows with overlaid semi-transparent windows, wherein the semi-transparent windows are sized and positioned to a total area of the display of the presenter device subtracted by the area having the viewable shared application windows;
    restrict input from one or more presenter interface devices associated with the presenter device to the plurality of semi-transparent windows; and
    pass inputs from the one or more presenter interface devices through the semi-transparent window to a covered non-shared application window beneath the semi-transparent window.

11. The software as in claim 10, further comprising instructions that when executed are further operable to:
    restrict input from one or more of a mouse and a keyboard.

12. The software as in claim 10, wherein the entire viewable area comprises a plurality of application windows, and further comprising instructions that when executed are further operable to:
    receive a selection at the presenter device of which of the plurality of the application windows should be shared.

13. The software as in claim 10, wherein the entire viewable area comprises a plurality of application windows, and further comprising instructions that when executed are further operable to:
    pre-designate which of the plurality of the application windows should be shared prior to initiating the online collaborative computing session at the presenter device.

14. The software as in claim 10, further comprising instructions that when executed are further operable to:

determine the position and size of each shared window application by dynamically monitoring and intercepting function calls made by the shared application to a graphics display subsystem.

15. The software as in claim 14, further wherein the instructions executed to determine the position and size of each shared window application comprise instructions that when executed are further operable to:

determine position and size of OpenGL regions of each shared application window by intercepting OpenGL function calls.

16. An apparatus, comprising:

a display;

a processor configured to execute one or more processes; and a memory coupled to the processor and configured to store one or more code modules, the one or more code modules when executed operable to join an online collaborative computing session in which the apparatus functions as a presenter device, wherein either an entire viewable area of a display of the apparatus or a portion of the entire viewable area is designated for transmission to one or more attendee devices for the online collaborative computing session;

determine one or more shared application windows on the apparatus that functions as the presenter device;

determine an area of the display of the presenter device having viewable shared application windows;

determine a plurality of areas of the display of the presenter device having viewable non-shared application windows;

generate a plurality of semi-transparent windows sized and positioned to the areas having the viewable non-shared application windows;

gray out each of one or more non-shared application windows on the display of the apparatus that functions as the presenter device by covering the non-shared application windows with overlaid semi-transparent windows, wherein the semi-transparent windows are sized and positioned to a total area of the display of the presenter device subtracted by the area having the viewable shared application windows;

restrict input from interface devices of the apparatus to the plurality of semi-transparent windows; and pass inputs from interface devices of the apparatus through the semi-transparent window to a covered non-shared application window beneath the semi-transparent window.

17. The apparatus as in claim 16, wherein the one or more code modules when executed are further operable to:

restrict input from one or more of a mouse and a keyboard.

18. The apparatus as in claim 16, wherein the entire viewable area comprises a plurality of application windows, and wherein the one or more code modules when executed are further operable to:

receive a selection at the presenter device of which of the plurality of the application windows should be shared.

19. The apparatus as in claim 16, wherein the entire viewable area comprises a plurality of application windows, and wherein the one or more code modules when executed are further operable to:

pre-designate which of the plurality of the application windows should be shared prior to initiating the online collaborative computing session at the presenter device.

20. The apparatus as in claim 16, wherein the one or more code modules when executed are further operable to:

determine the position and size of each shared window application by dynamically monitoring and intercepting function calls made by the shared application to a graphics display subsystem.

* * * * *